Figure 1:
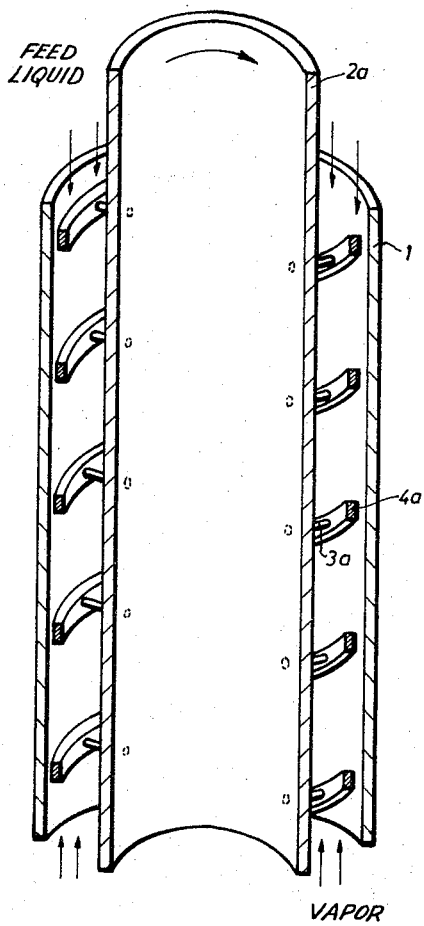

ial blades 5b
United States Patent Office 3,366,157
Patented Jan. 30, 1968

3,366,157
VERTICAL ROTATORY WIPED FILM EVAPORATOR
Rolf Germerdonk, Schildgen, Klaus Böckmann, Cologne-Stammheim, and Erich Schoenert, Leverkusen, Germany, assignors to Farbenfabriken Bayer Aktiengesellschaft, Leverkusen, Germany, a corporation of Germany
Filed Feb. 16, 1966, Ser. No. 527,836
Claims priority, application Germany, Feb. 24, 1965, F 45,341
5 Claims. (Cl. 159—6)

This invention relates to an apparatus whose particular use is for rectifying temperature-sensitive viscous mixtures, suspensions or emulsions.

In conventional rectifying columns with fixed fittings (for example, tower packings, bubble trays or cone pans), used for the rectification of viscous mixtures or mixtures containing constituents suspended or emulsified in the liquid phase, the gaps provided for the counterflow of vapour and liquid become blocked very easily. The known thin-film or falling-film evaporators with heated jackets, in which the liquid flows downwards along the inner wall of a vertical tube in the form of a thin film which is vigorously stirred by rotating rigid or movable scrapers, are also unsuitable for the rectification of mixtures of the aforementioned kind. Although the danger of blocking is not so serious in apparatus of this latter kind, its efficiency as a rectifier is far from adequate in instances where it is intended, for example, economically to remove water-soluble solvents from dyestuff suspensions, because the number of theoretical plates is not really any larger than 1. Although there is a larger number of theoretical plates in the apparatus known as a thin film rectifier, comprising a heated, outer cylinder and a system of rotating cooled scrapers, apparatus of this kind is frequently too uneconomical to use for the rectification of viscous mixtures or suspensions because the heating medium and coolant consumption is much greater than the minimum theoretical requirement because material-exchange and heat-exchange do not occur at the same place. In addition, the scraper systems in apparatus of this kind are not suitable for the treatment of viscous suspensions showing a tendency to agglomerate. The major advantage of falling-film or thin-film rectifiers, i.e. their negligibly small pressure loss, is frequently of little significance as far as the type of rectification function under discussion here is concerned, for example the removal of water-soluble solvents from suspensions, because, in cases such as these, a pressure loss of a few millimetres of mercury between the head and tail product, is generally permissible.

It has now been found that temperature-sensitive mixtures with poor flow properties can be rectified by means of a thin-film or falling-film apparatus which, according to the invention, comprises a vertical cylindrical and preferably thermally insulated tube, arranged in which is a scraper shaft in the form of a displacement body to which one or more helically twisted scraper arms or bars are attached in such a way that, without touching the wall of the tube, they spread the liquid flowing downwards along the inner wall of the tube, into a film whose surface is continuously being renewed, and at the same time displace it downwards, whilst the vapour is guided upwards through the uninterrupted annular gap between the displacement body and the wall of the tube.

Figure 2:
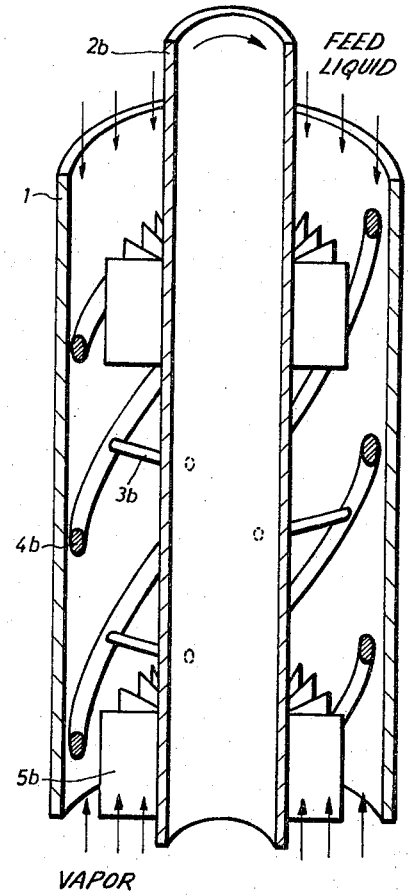

Referring now to FIGS. 1 and 2, the apparatus comprises a cylindrical, vertical and thermally insulated tube 1 in which rotates a non-cooled shaft 2a or 2b in the form of a displacement body. One or more helically twisted scrapers 4a or 4b are attached to the shaft 2a, 2b by means of stays 3a or 3b. The clearance between the inner wall of the tube 1 and the scraper system is, in this instance, from 0.1 to 5 millimetres. Under certain operating conditions which will be more fully discussed hereinafter, additional fittings, for example, radial blades 5b are arranged inside the scraper system 4a, 4b.

The apparatus operates as follows: The liquid to be rectified is spread out on the inner wall of the tube 1 by the scrapers 4a, 4b, into a thin film whose surface is continuously renewed, and at the same time is displaced downwards. The liquid itself is introduced at the head of the tube 1, as known per se through a distributor ring or similar auxiliary fitting. The vapour coming from a separate vaporiser flows upwards through the annular gap between the shaft 2a, 2b and the tube 1, in countercurrent to the liquid. Since this procedure is really a form of thin-film rectification in which the surface of the liquid film is continuously renewed by a mechanical means, whilst at the same time the liquid is displaced downwards, it is possible to obtain higher material-exchange rates in the rectification of poorly flowing mixtures, in comparison with conventional falling-film columns. By virtue of the shape of the scrapers 4a, 4b, the material-exchange rates can be increased, particularly in the case of mixtures in which the resistance to material exchange is due mainly to the liquid, for example suspensions in which part of the substance to be converted into the vapour phase, adheres to the surface of the solid because of adhesion or capillary forces. By virtue of the geometry of the scraper system 3a, 3b and 4a, 4b, and the scraper shaft in the form of a displacement body, considerable turbulence is set up in the vapour phase which in turn results in a low resistance to material exchange or transfer on the vapour side.

Since the exchange of heat and material required for rectification takes place at the layer or film separating the vapour from the liquid, the consumption both of heating medium and of coolant is the same as in a conventional rectifying column comprising fixed fittings or baffles with the same number of theoretical plates.

The flow and transport of the liquid may be influenced, at a given throughput volume per unit of time, by the following design factors: diameter of the tube 1, distance between the tube 1 and the scrapers 4a, 4b, inclination, profile and number of scrapers 4a, 4b, and by the speed of rotation of the shaft 2a, 2b. The most suitable rate of vapour flow for rectification may be obtained by suitable choice of the diameter for the shaft 2a, 2b.

This will now be explained by way of a comparison between the two embodiments illustrated in FIGS. 1 and 2: The apparatus shown in FIG. 1, is suitable for non-agglomerating liquids, fairly long residence times and relatively small quantities of vapour. The residence time range for the liquid is more favourable than in the case of the embodiment shown in FIG. 2 since, because of the rectangular profile of the scrapers 4a, the liquid film is stirred around close to the wall and re-formed, particularly when the clearance between the inner wall of the tube 1 and the scrapers 4a, is small. The apparatus shown in FIG. 2 is designed for use with larger quantities of vapour or for operation under reduced pressure. The vapour flowing through the widened annular space is additionally whirled around by radial blades 5b or similar baffles in order to improve material exchange. The circular profile of the scraper stays 3b is particularly suitable for agglomerating suspensions because the agglomerates can be broken up between the inner wall of the tube 1 and the scrapers 4b due to the mechanical stress caused by the wedge-shaped gap.

An apparatus of the type described herein is preferably used as an ordinary separation column; the mixture to be separated being introduced at the top end. It is possible, however, to introduce the mixture to be rectified at the centre of the apparatus, and to operate the upper section as a "regenerating column," in which case some of the distillate would have to be collected at the top for recycling, in a manner which is known per se. This method of operation is of advantage in cases where, for example, the distillate which is to be recovered in pure form, is also viscous or in cases where the vapour mixture in equilibrium with the product feed, forms a mixture with poor flow properties (for example an emulsion) on condensation.

It is also possible with the apparatus described herein to carry out non-adiabatic rectification with a concentration "pattern" influenced by pre-determination of the distillation temperature along the path followed by the liquid. This is because the liquid flowing through each cross-section of the rectifying column is guided along the wall in the form of a thin, mechanically agitated film so that it is possible, by pre-determined cooling and/or heating of the tube wall 1, to set the required temperature "pattern" along the path followed by the liquid, at the high heat-transfer rates which can be obtained in thin-film or falling-film apparatus.

We claim:
1. An evaporator which comprises a vertical cylindrical outer tube disposed to receive a liquid introduced at the upper end thereof for treatment while flowing downwardly in a film along the interior surface thereof and to discharge said liquid at the lower end thereof, a cylindrical member disposed within said outer tube and for coaxial rotation relative thereto, said cylindrical member being lesser in diameter than the interior surface of said outer tube to define therewith a passage annular in cross section to accommodate the flow therethrough of vapors introduced at the lower end of said passage and discharged at the upper end thereof after flowing in contact with said liquid film for progressively treating same, and film distributing means including a continuous helical bar member approximately coextensive in axial length with said outer tube, and a plurality of radially extending strut members connected to said helical bar member and to said cylindrical member to support said helical bar member in a radially spaced-apart relation to said cylindrical member for coaxial rotation therewith, and to allow substantially unimpeded flow of treating vapors through said passage, said helical bar member having an external diameter dimensioned in relation to the interior surface diameter of said outer tube to provide a predetermined radial clearance therebetween, said radial clearance corresponding to a selected liquid film thickness, whereby when said cylindrical member rotates, the helical bar member distributes said liquid in a film of such selected thickness over substantially the entire area of said outer tube interior surface for maximum film surface area contact with the treating vapors and without any physical contact between said helical bar member and the outer tube.

2. The rectifier apparatus according to claim 1 wherein said helical bar member is arranged to aid the downward flow of said liquid film along said outer tube interior surface when rotated with said cylindrical member in a predetermined direction.

3. The rectifier apparatus according to claim 1 wherein said radial clearance is within the range 0.1 to 5 millimeters.

4. The rectifier apparatus according to claim 1 said helical bar member is circular in cross section to define a wedge-shaped gap between the helical bar member and the interior surface of said outer tube.

5. The rectifier apparatus according to claim 1 including at least one blade member connected to said cylindrical member for rotation therewith and projecting radially therefrom to apply a circulatory motion to treating vapors flowing through said passage.

References Cited
UNITED STATES PATENTS

| | | | |
|---|---|---|---|
| 2,546,380 | 3/1951 | Zahm | 159—6 |
| 2,740,580 | 4/1956 | Schmiedel | 233—7 |
| 2,927,634 | 3/1960 | Gudheim | 159—6 |
| 3,211,209 | 10/1965 | Latinen et al. | 159—6 |
| 3,250,687 | 5/1966 | Frank | 159—13 |
| 3,252,502 | 5/1966 | Eckhardt et al. | 159—6 |

FOREIGN PATENTS

| | | |
|---|---|---|
| 1,123,231 | 9/1956 | France. |
| 1,366,682 | 6/1964 | France. |
| 1,384,653 | 11/1964 | France. |

WILBUR L. BASCOMB, JR., *Primary Examiner.*

NORMAN YUDKOFF, *Examiner.*

J. SOFER, *Assistant Examiner.*